United States Patent
Waelbroeck et al.

(10) Patent No.: US 7,356,500 B1
(45) Date of Patent: Apr. 8, 2008

(54) METHOD FOR DIRECTING AND EXECUTING CERTIFIED TRADING INTERESTS

(75) Inventors: Henri Waelbroeck, Scarsdale, NY (US); Fred J. Federspiel, Larchmont, NY (US); James J. Angel, Arlington, VA (US)

(73) Assignee: Pipeline Financial Group, Inc., New York, NY (US)

( * ) Notice: Subject to any disclaimer, the term of this patent is extended or adjusted under 35 U.S.C. 154(b) by 1634 days.

(21) Appl. No.: 09/585,049

(22) Filed: Jun. 1, 2000

(51) Int. Cl.
*G06Q 30/00* (2006.01)

(52) U.S. Cl. .................. 705/37; 705/26; 705/27; 705/35; 705/36; 705/38

(58) Field of Classification Search .......... 705/26, 705/27, 37, 38, 39, 40, 35, 36
See application file for complete search history.

(56) References Cited

U.S. PATENT DOCUMENTS

| | | | | |
|---|---|---|---|---|
| 5,136,501 A | | 8/1992 | Silverman et al. ............ 705/37 |
| 5,717,989 A | * | 2/1998 | Tozzoli et al. ................ 705/37 |
| 5,724,524 A | | 3/1998 | Hunt et al. .................... 705/26 |
| 5,794,207 A | * | 8/1998 | Walker et al. ................ 705/26 |
| 5,842,178 A | | 11/1998 | Giovannoli .................... 705/26 |
| 5,924,082 A | | 7/1999 | Silverman et al. ............ 705/37 |
| 5,950,177 A | | 9/1999 | Lupien et al. ................ 705/37 |
| 6,236,979 B1 | | 5/2001 | Kawabata |
| 6,260,025 B1 | * | 7/2001 | Silverman et al. ............ 705/37 |
| 6,285,983 B1 | | 9/2001 | Jenkins |
| 6,421,653 B1 | * | 7/2002 | May ........................... 705/37 |
| 6,578,014 B1 | * | 6/2003 | Murcko, Jr. ................. 705/26 |
| 2002/0052827 A1 | | 5/2002 | Waelbroeck |
| 2002/0082967 A1 | | 6/2002 | Kaminsky |
| 2003/0004859 A1 | | 1/2003 | Shaw et al. |
| 2003/0009411 A1 | | 1/2003 | Ram |
| 2003/0083973 A1 | | 5/2003 | Horsfall |

OTHER PUBLICATIONS

PCT/ISA/210 fro PCT/US07/08745.

* cited by examiner

*Primary Examiner*—Nga Nguyen
(74) *Attorney, Agent, or Firm*—Morgan, Lewis & Bockius LLP; Steven D. Underwood, Esq.; Pristine Johannessen, Esq.

(57) ABSTRACT

Preferred embodiments of the subject invention overcome the limitations of known trading interest dissemination and execution systems by (1) enabling market participants to limit dissemination of trading interests to only those other market participants likely to have a significant contra-interest, (2) enabling market participants to ensure that other market participants' disseminated trading interests are legitimate, and (3) enabling auctions among trading interests targeted and validated in this manner. Software of a preferred embodiment identifies likely contra-interests by analyzing information from various sources regarding certified trading interests.

58 Claims, 4 Drawing Sheets

METHOD FOR DIRECTING AND EXECUTING CERTIFIED TRADING INTERESTS

FIELD OF THE INVENTION

The subject invention relates to a method for managing certified trading information to direct and execute confidential trading interests over a computer network such as the Internet.

BACKGROUND OF THE INVENTION

The term "trading interest" is used herein to describe any expressed interest in trading a given security or securities, and the term "certified trading interest" is used herein to describe a trading interest that has been verified as genuine and certified as such by some trusted third party. One example of a genuine trading interest is an order that has been placed on a securities market automatic matching system. A second example of a genuine trading interest is a trading interest expressed by a party with a documented history of aggressive trading. An example of a trading interest that would not be certified is an undocumented indication of interest (known in the art as an IOI).

In public securities markets, market mechanics and trading psychology create barriers to efficient information dissemination and price discovery. A market participant's decision to reveal information regarding a large trading interest typically represents a tradeoff between confidentiality and liquidity. By publicly revealing the details of a significant active buying interest, for example, a market participant assumes the risk of adverse price action. Other market participants with legitimate selling interests and market makers can "fade" their offers (become much less aggressive sellers). There is also an empirically demonstrable risk of adverse price action due to "front running" (buying activity by market participants in anticipation of price movement resulting from the large revealed order). Confidentiality can be maintained by splitting the large order up into many small orders to avoid arousing interest, but this is inefficient and will fail to attract substantial natural contra-interests. An economically efficient transaction is therefore avoided because the trading costs associated with disseminating information are too high. Also, the common practice of splitting large interests into smaller orders affects all price discovery. When confronting each order, a market participant must incorporate the possibility that the order is only a small part of a much larger interest, because it is often impossible for the market participant to verify that many such orders are not being sent simultaneously.

Another serious obstacle to efficient dissemination of trading interests and price discovery is the lack of validated information about trading interests. The validated trading interest information which does exist (e.g., displayed executable orders) is often of little assistance. Displayed orders are miniscule compared to undisclosed interest, and typically equate to no more than one or two minutes of trading in a liquid stock in the U.S. market. Displayed orders can therefore be easily manipulated, for example, to indicate excess buying interest when sellers are in fact abundant. In addition, non-validated misinformation is often created and disseminated by unscrupulous market participants to manipulate market prices. Voluntarily disseminated trading interests can be false or misleading if they are not verified either by proof of a current executable order, actual trades executed, or canceled orders which were at one point executable at risk in the market. Because there is often no way for a market participant to verify an expressed trading interest or to know which other market participants have a history of unscrupulous trading behavior, all prices must incorporate the possibility of such behavior.

One known approach to voluntary selective dissemination of non-validated trading interests and activity in public equity markets is used by the AutEx+® system. This is an electronic database and online network that provides users with the ability to voluntarily publicly indicate trading interests and executed trades. AutEx+® users can limit the recipients of a message regarding a trading interest by inclusion (a user-defined list) or exclusion (blocking specific named market participants). Users can also limit by name the securities on which they receive information and the other users from whom they receive information.

In the AutEx+® system the expressed trading interests and reported trades are not certified, however, and this creates the opportunity for deceptive dissemination. In addition, users of the system are not obligated to report all trades, which offers further opportunities to create false impressions of trading interests. Significantly, this approach does not enable the use of analysis of certified trading interests (CTI) to limit information dissemination to those market participants likely to have a contra-interest. It also does not enable using such CTI analysis to permit market participants to limit the trading interest indications received. It also does not provide the ability to initiate an auction based on disseminated CTI analysis information. It also does not enable the monitoring of user trading activity to generate a rating of the accuracy of disclosures or the correlation of trading activity to inappropriate trading practices.

One known approach to matching trading interests and executing trades while limiting information dissemination is employed by the POSIT® matching system. The POSIT® system allows trading interests to accumulate and initiates a matching sequence at set intervals. Market participants place confidential orders in the system and are unaware of the amount or aggressiveness of other orders on the same or contra side until the matching is released. This approach does not enable targeted communication of trading interests based on analysis of verified executable interests and trading activity, and does not provide the ability to initiate private auctions based on this analysis. It also does not enable granting the auction initiator any exclusivity over contra-orders entered in response to the targeted dissemination.

In this environment, there is an acute need for efficient dissemination of confidential information regarding trading interests. Market participants with large confidential trading interests wish to notify only those other market participants likely to have a significant contra-interest. Other market participants wish to be notified of confidential certified trading interests to which they are likely to have a contra-interest. Both groups wish to have a place to transact a trade once they have been connected through analysis of their certified trading interests. Market participants also desire certified information regarding the trading behavior of other market participants and a means of certifying expressed trading information.

SUMMARY

Preferred embodiments of the subject invention overcome the limitations of known trading interest dissemination and execution systems by (1) enabling market participants to limit dissemination of trading interests to only those other market participants likely to have a significant contra-interest, (2) enabling market participants to ensure that other market participants' disseminated trading interests are legitimate, and (3) enabling auctions among trading interests targeted and validated in this manner. Software of a preferred embodiment identifies likely contra-interests by analyzing information from various sources regarding certified trading interests.

A preferred embodiment comprises a method of managing market information, comprising the steps of: electronically receiving data including confidential information regarding market participants; electronically storing said received data regarding market participants; electronically receiving information from a first market participant computer; electronically storing said information received from said first market participant computer; producing a targeted dissemination list of market participants based on said stored data regarding market participants and said information received from said first market participant computer; and electronically transmitting to the market participants on said targeted dissemination list data based on said information received from said first market participant computer.

Advantageously, this is done without revealing the confidential information of the market participants to the first market participant. In one embodiment, the identity of the first market participant is not revealed to the other participants.

Further embodiments are described below.

DETAILED DESCRIPTION OF PREFERRED EMBODIMENTS

Figure 1:
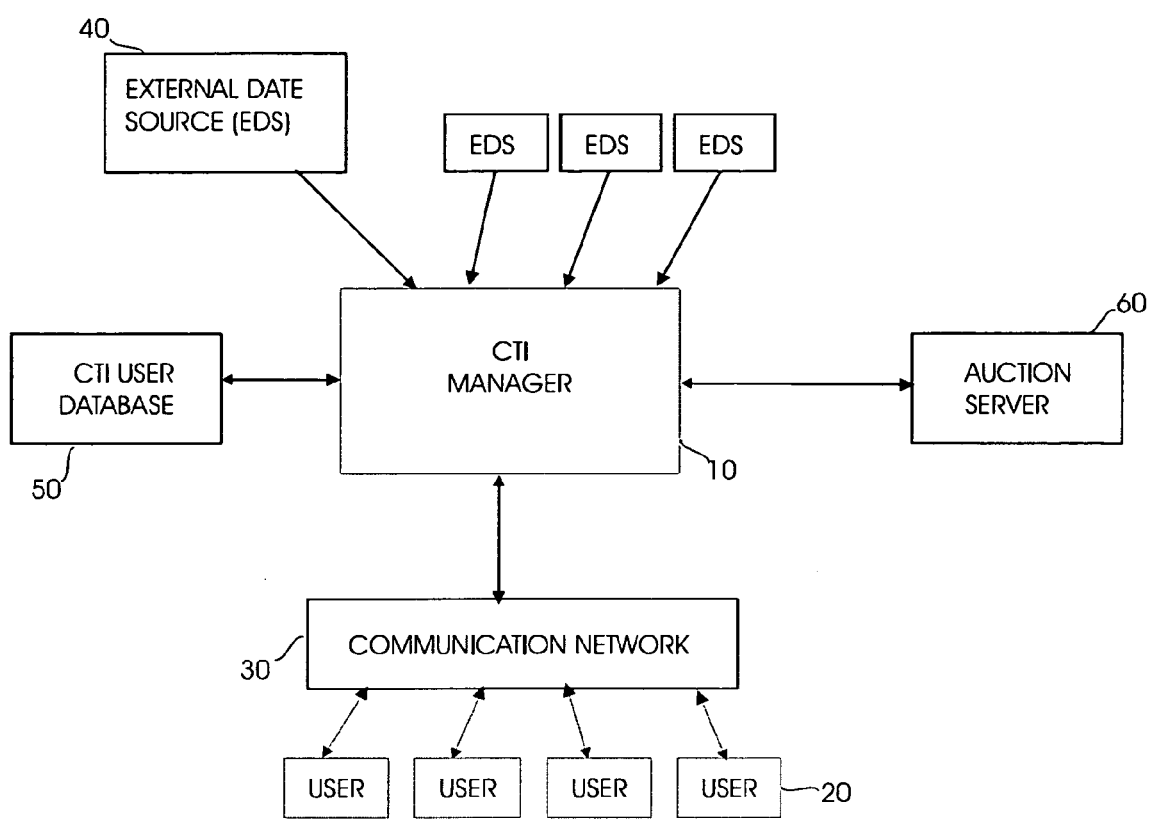
FIG. 1 is a schematic diagram depicting a preferred embodiment of the subject invention.

FIG. 1 illustrates a system configuration of a preferred embodiment of the subject invention that comprises a certified trading interest (CTI) manager 10 connected to various users 20 via a communication network 30. CTI manager 10 is a computer comprising a processor, a memory, and input/output including a communications interface. Computer programs stored in the memory operate the CTI manager in accordance with the invention. In the preferred embodiment, communication network 30 is the Internet, but alternate embodiments can employ dedicated communication networks, as is well known in the art. In the preferred embodiment, communication between users and the CTI manager is secured, because of the confidential nature of the information communicated. The CTI manager 10 is also connected to various external data sources 40, a CTI user database 50, and an auction server 60.

External data sources 40 provide information regarding positions held, trades executed, and active orders for the users 20. This enables the CTI manager to identify and verify users' historical and current trading interests. In an alternate embodiment, the CTI manager does not receive external data, but only uses data generated within the system. In a preferred embodiment applied to the U.S. equity market, the external data sources 40 include various electronic communication networks (ECNs) such as Instinet™, public markets such as NASDAQ™, stock exchanges, matching networks such as POSIT®, and publicly available data such as the published holdings of various institutional investors. In a preferred embodiment, the data regarding market participants used by the CTI manager comprises confidential information. For example, the identity of an executable order on an ECN is not typically available. Since the confidential information is not publicly available, the CTI system must obtain permission from the users 20 to utilize it. In the preferred embodiment users 20 agree to release this confidential information to the CTI system, with the understanding that the secure CTI system will use the information only for supplying the user with valuable confidential trading interests of others. In other words, the confidential information with which users 20 entrust the CTI manager 10 gives them access to more information (in particular, certified trading interests), but the confidential information provided by users 20 does not leak out to third parties.

In a preferred embodiment, the CTI manager 10 communicates in real time with external data sources 40 via the Internet. Alternate embodiments employ dedicated communication networks as is well known in the art. Also, alternate embodiments store information from external data sources 40 in a database and update the information periodically rather than in real time. For example, an alternate embodiment receives information regarding the published holdings of various institutional investors, stores the information in a database, and updates the information from the news service source only as frequently as new information is published. As will be apparent to those skilled in the art, the subject invention could also be used to direct confidential information in markets other than U.S. equities, since virtually all markets for fungible items of value pose the same informational inefficiencies.

In a preferred embodiment, the CTI user database 50 contains user data such as security and contact information, CTI notification parameters, and an activity history. The preferred embodiment maintains an activity history for each user that includes auctions initiated and their outcome (e.g., whether the auction was canceled, unsuccessful in locating a contra-interest, or resulted in a partial or full execution of the initiating interest). The activity history also includes the CTI notifications received, the orders placed in response, and their outcome (whether the responding order was canceled, unsuccessful, or resulted in a partial or full execution of the response order). In an alternate preferred embodiment, the CTI user database 50 simply maintains overall statistics regarding this activity history for each user.

The CTI notification parameters specify the circumstances in which CTI information is to be received and can be different for different securities and different users. For example, some users may limit CTI notifications to initiating interests over 100,000 shares for certain securities and 500,000 shares for others. In a preferred embodiment the notification parameters can be modified by the user at any time, and can be on the basis of order size, security, identity of initiating user, or statistics regarding the initiating user's activity history.

In an alternate preferred embodiment, the CTI user database 50 also contains information regarding inappropriate trading behavior such as peg gaming and front running. Peg gaming is possible when an auction sets the execution price to be the market midpoint at a specific time. An auction participant with a large buy order might sell actively in the market to pull the midpoint price down. Front running is possible in this context if, for example, a recipient of a notification of a large buy order starts buying CTI trades actively before the auction in anticipation of price action caused by the large CTI. The CTI manager of this embodiment will monitor the trading activity of all auction participants and note any suspected peg gaming or front running in the CTI user database, either as raw data or as a rating of trading behavior. An alternate embodiment maintains similar data and/or ratings in the CTI user database 50 regarding the accuracy of the market participants' non-certified disclosures on external systems such as AutEx+®. A further embodiment maintains similar data and/or ratings in the CTI user database 50 regarding the market participants' adherence to self-imposed trading limits set during negotiations. This list is not intended to be exhaustive; other embodiments will be apparent to those skilled in the art.

Figure 2:
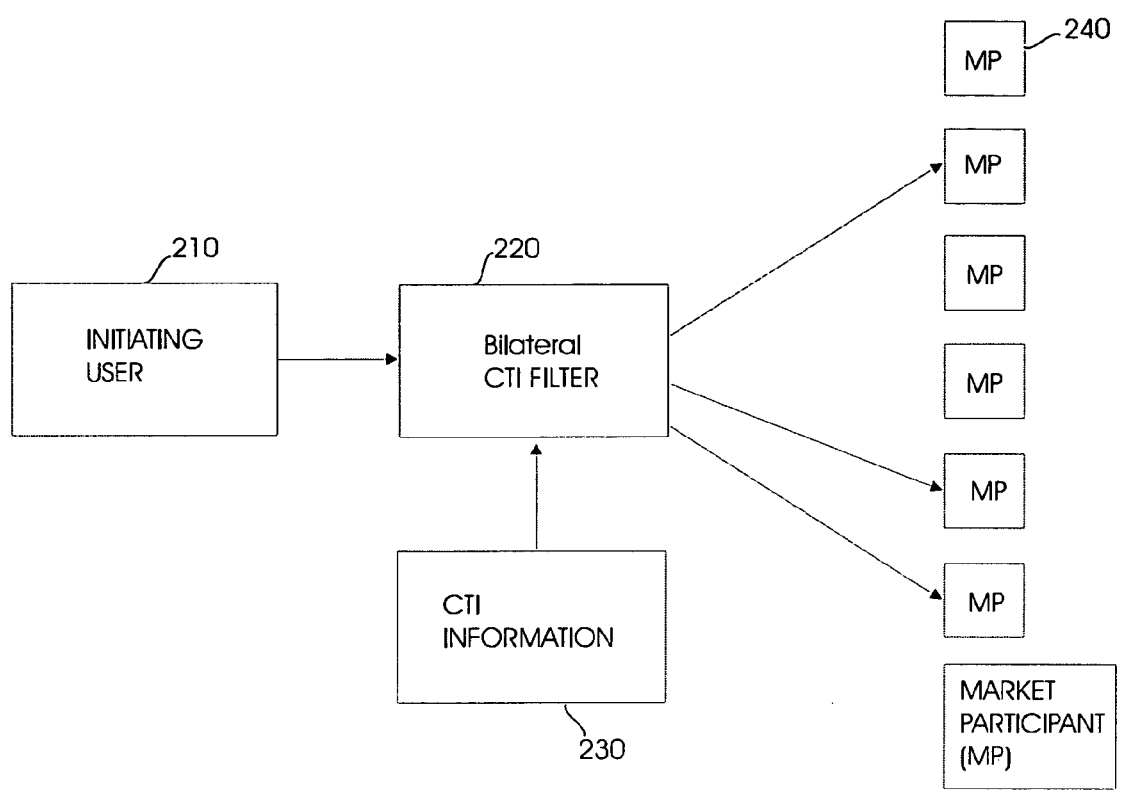
FIG. 2 is a schematic diagram depicting a preferred system for targeted dissemination of confidential information regarding trading interests.

The auction server 60 manages the process of accumulating market participant (MP) contra-orders in response to a CTI notification and executing a matching auction. In an alternate embodiment, there is no auction server and the CTI system functions as a targeted information dissemination mechanism. FIG. 2 depicts the information management function of a preferred embodiment of the subject invention. An initiating user 210 communicates to the CTI manager a trading interest and parameters that limit the dissemination of the information. The CTI manager uses these parameters and CTI information 230 to determine which market participants 240 should receive the information. Also, each MP communicates his own parameters to the CTI manager delineating the trading interest information that the MP desires to receive. The CTI manager therefore acts as a bilateral CTI information filter 220. It limits dissemination of the initiating user's confidential information to those MPs 240 for which (1) the MP fits the initiating user's dissemination parameters, and (2) the initiating interest fits the MP's notification parameters. In an alternate embodiment, the CTI manager is only a unilateral information filter in which the system targets MPs to notify but does not allow the MP to similarly filter notifications. Comparing FIG. 1 and FIG. 2, in a preferred embodiment both the initiating user 210 and the market participants 240 are users 20 of the system, the bilateral CTI information filter 220 is the CTI manager 10, and the CTI information 230 is supplied by the external data sources 40 and the CTI user database.

Figure 3:
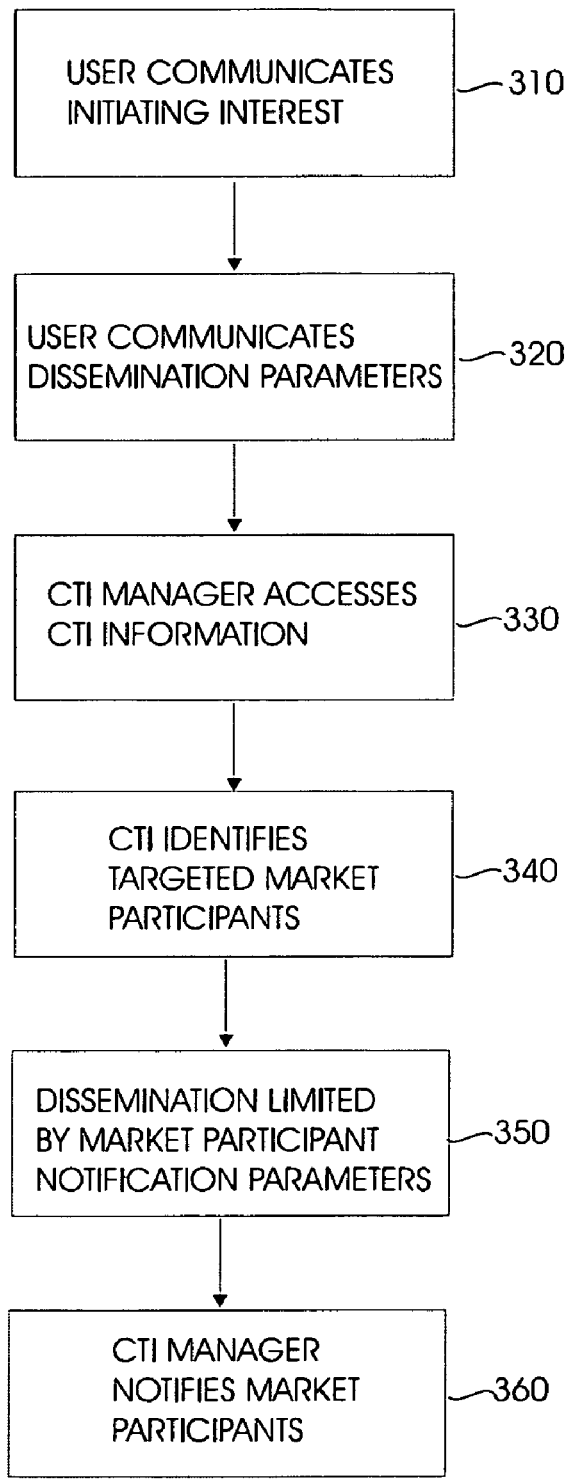
FIG. 3 is a flowchart illustrating steps of a preferred method of targeted dissemination of confidential information regarding trading interests.

FIG. 3 is a flow diagram of the operation of an information management function of a preferred embodiment. In step 310, a user communicates an initiating interest to the CTI manager. In the preferred embodiment, the initiating interest is a live executable order submitted to the CTI system to initiate an auction, but in alternate embodiments the initiating interest can be other information that the CTI system must then certify. For example, the user may wish to selectively disseminate the existence of a large executable order that a user has placed in another market or auction system such as an ECN or POSIT®. The user would submit information regarding the order, and the CTI system would then verify the existence of the claimed order, so that all market participants subsequently notified of the order can rely on the truthfulness of the dissemination. Similarly, the user can submit an indication of interest, which the system then certifies from verified information regarding current executable orders, recent trading history, and/or canceled orders which were once executable but were not filled. Once again, all market participants subsequently notified of the interest can rely on the truthfulness of the dissemination. In an alternate embodiment, the user can submit a non-certified trading interest, but this lack of certification is indicated to all market participants subsequently notified.

In a preferred embodiment, the initiating interest includes a price limit, which can be a nominal value (e.g., $112½) or pegged to a market price when the price is set (e.g., market midpoint set at the termination of the auction). Alternate embodiments enable the initiating user to peg the price limit to a yet-to-be-determined market value or index. For example, in an alternate embodiment the user can peg the price limit to the daily volume weighted average price (VWAP) as will be calculated at the end of the trading session. In the preferred embodiment, the initiating interest includes auction parameters such as the length of the accumulation period.

In step 320, the user communicates the desired dissemination parameters. In the preferred embodiment, there are many dissemination parameters available to the user, the most important being various measures of certified contra-interest. In the preferred embodiment, the user can specify certified contra-interest from (1) live executable orders; (2) past executed trades; or (3) canceled orders that were once executable but were not filled. Examples of CTI-based filtering of dissemination of an interest to buy 500,000 shares of a certain stock include limiting dissemination to (1) MPs or other system users presently offering 10,000 or more shares of that stock in the marketplace; (2) MPs or other system users who have sold over 25,000 shares of that stock in the current trading session; (3) MPs or other system users who have offered blocks of over 10,000 shares of that stock in the current trading session; or (4) MPs or other system users who have bought at or above the National market Best Offer in the current trading session. The quantities and time horizons in these parameters are all selectable by the user.

In a preferred embodiment, there are many other parameters available to the user that employ market information from the external data sources 40 and the CTI user database 50 to more accurately target dissemination to desired market participants. For example, the user can choose to notify only those market participants with certain response or initiation statistics (e.g., directing the CTI manager to notify only market participants who have responded to 10% of CTI notifications received in a certain time frame or to a certain total number of CTI notifications). In addition, the preferred embodiment enables the user to target MPs with certain known holdings in the security of interest. The preferred embodiment also enables users to exclude MPs from notification on the basis of their history of trade breaks (e.g., preventing CTI information from reaching any MP who has broken some quantity of trades in some period of time). The preferred embodiment also enables users to include or exclude specific MPs from notification by name or identification number.

In an alternate preferred embodiment, the user can also target MPs based on more sophisticated analysis performed by the CTI manager on the trading patterns of various users to identify certain correlations or pattern recognition (e.g., buyer of technology stocks, sector rotation, etc.). In another preferred embodiment, the user can exclude MPs based on any identified inappropriate trading behavior such as front running and peg gaming stored in the CTI user database 50. In another alternate embodiment, the dissemination parameters are system-defined and not selectable by the user. In yet another alternate embodiment, the user can choose between defining some or all of the dissemination parameters and using system-defined default parameters.

Referring back to FIG. 3, at step 330 the CTI manager accesses the necessary CTI information from the external data sources 40 and the CTI user database 50 to perform the CTI filtering analysis. At step 340, the CTI manager analyzes CTI information using the dissemination parameters and produces a list of MPs to notify. At step 350, the CTI manager further reduces the MP notification list using the MP notification parameters stored in the CTI user database 50. At step 360, the CTI manager sends notification of the confidential initiating CTI to those MPs for which (1) the MP fits the initiating user's dissemination parameters, and (2) the initiating interest fits the MP's notification parameters. In an alternate embodiment, the notification includes statistics regarding the initiating user's past auctions (e.g., proportion filled, cancel rate, frequency of trade breaks, etc.).

In an alternate preferred embodiment, after step 350 the initiating user is shown a summary of the results of this analysis and is given the option of modifying the dissemination parameters given in step 320 to more accurately tailor/limit the dissemination of confidential CTI. For example, a user can modify dissemination parameters that are too inclusive (e.g., too many MPs have sold 10,000 or more shares of the relevant security today) or exclusive (e.g., there are no MPs who currently have a live order to sell over 50,000 shares). The production of the MP notification list is an iterative process in this embodiment, as the embodiment repeats steps 330-350 until the user is satisfied with the output of the dissemination analysis. The user interaction in this iterative process is performed through interface means that are well known in the art.

Figure 4:
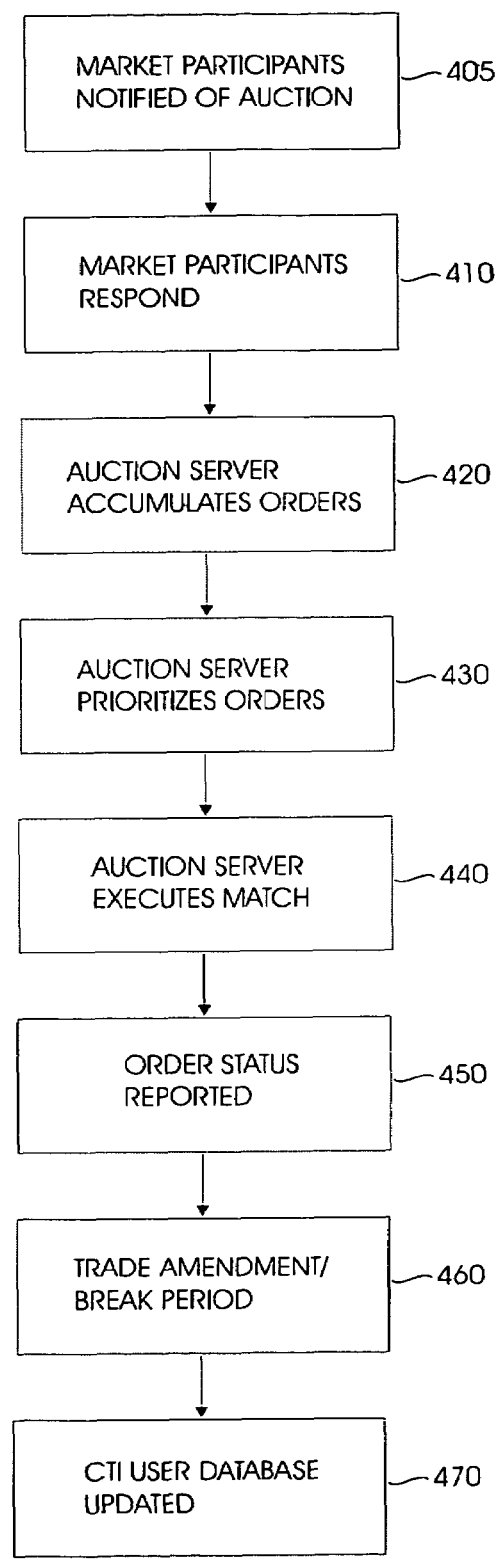
FIG. 4 is a flowchart showing steps of a preferred method of matching interests identified by targeted dissemination in an auction execution.

FIG. 4 is a flow diagram of the operation of the CTI management system in executing an auction based on the disseminated initiating interest. At step 405, notification of an auction initiated by a CTI is disseminated to targeted MPs in the process depicted in FIG. 3. At step 410, the notified MPs have the option of responding to the notification. In the preferred embodiment, this response is an executable price-limited contra-order sent to the auction server. As with the initiating interest, in the preferred embodiment the price limit can be either a nominal value or pegged to a market price. Alternate embodiments enable the responding MP to peg the price limit to a yet to be determined market value or index. For example, in an alternate embodiment the MP can peg the price limit to the end of day VWAP.

An alternate embodiment enables the notified MPs to simultaneously submit a trading interest and send a message to the initiating user to directly negotiate a trade. Another alternate embodiment enables the notified MPs to respond via a private chat session to directly negotiate a trade. Alternate preferred embodiments also enable the MP to respond in a semi-private negotiation chat session with the initiating user and some or all of the other notified MPs. The system provides the chat and messaging functionality using interactive communication technology as is well known in the art. Alternate preferred embodiments also provide the notified MPs with the initiating user's phone number and/or e-mail address to provide other channels of direct communication.

In step 420, the auction server 60 accumulates orders from the notified MPs. In the preferred embodiment, the duration of the accumulation period is set by the initiating user in the auction parameters communicated in step 310, subject to a system-defined minimum and maximum. This enables users of the CTI system to initiate auctions at any time and limit them to MPs with verified contra-interest, in sharp contrast with the POSIT® system in which users must wait for periodic matching sessions which are not targeted in any way. In alternate embodiments, there is a fixed, system-defined accumulation period. In another preferred embodiment, the system sets the end of the accumulation period, subject to a minimum and maximum. If possible, the system sets the end of the accumulation period to match the end of the accumulation period of any other pending auction so that the auctions can be combined to increase total liquidity. In the preferred embodiment, during the accumulation period, the initiating user and the notified MPs can modify or cancel their orders placed in the auction server. Alternate embodiments place restrictions on this ability. For example, an alternate embodiment does not permit the initiating user to cancel the auction after notified MPs have responded with contra-orders; the initiator is locked into the order once a MP has relied on it to respond with a contra-order.

In step 430, the auction server 60 of a preferred embodiment prioritizes the contra-orders sent by notified MPs. The preferred embodiment creates an execution priority by the following sequential rules:

1) Total matched size—Combinations of contra-orders are chosen which maximize total size executed.
2) Price limit—If competing MP contra-orders would produce equal matched quantities, the auction server will first execute MP contra-orders with more aggressive price limits.
3) Size limit—If competing MP contra-orders have the same (or no) price limit, the auction server will first execute orders with more aggressive size limits.
4) Time of entry—If competing MP contra-orders have the same size limit, the auction server will first execute orders entered earlier.

Alternate embodiments that employ different execution priority rules will be apparent to those skilled in the art. For example, one alternate embodiment ignores the size limit of the contra-order; in another alternate embodiment, where there are no price limits and actual execution is at the market midpoint at the moment of matching, execution priority is by time of entry.

The above description assumes that the initiating interest is the only order on one side, and all orders sent to the auction server by notified MPs are on the contra-side. It is possible that a notified MP responds with an order on the same side as the initiating interest, necessitating an execution priority for that side as well. In a preferred embodiment, the initiating interest has absolute execution priority over subsequent MP orders. This is an additional benefit of the CTI system from the initiating user's perspective. The system enables the initiating user to target dissemination of a confidential trading interest to MPs with a certified contra-interest, to influence the auction timing, and obtain priority in matching over contra-orders placed in response. All orders placed by notified MPs on the same side as the initiating interest are executed only after the initiating interest is filled, and according to the execution priority outlined above. Once again, alternate embodiments that employ different execution priority rules will be apparent to those skilled in the art. Furthermore, in an alternate embodiment, the initiating interest is not granted absolute priority over competing orders subsequently placed by notified MPs, and must compete according to the ordinary execution priority.

In another embodiment, more than one auction can be combined to pool liquidity. In a combined auction, each initiating interest is given exclusivity over contra-orders placed by notified MPs in response to that respective initiating order. By "exclusivity" it is meant that a contra-order placed in response to an initiating order cannot be matched with any other order until the initiating order is filled or canceled. In an alternate preferred embodiment, there is no priority or exclusivity granted to the initiating orders in a combined auction, and all orders compete according to the same execution priority. Alternate embodiments that employ other means of combining auctions will be apparent to those skilled in the art.

In step 440, the auction server executes the orders according to the execution priority set in step 430, all at a price set by the type of auction employed. If there are no MP responses or no trade is possible given the limit prices, the auction is unsuccessful and is terminated. In a preferred embodiment, the auction server employs a midpoint cross auction, where all orders are executed at market midpoint at a certain time. To avoid peg gaming, in the preferred embodiment the execution price is pegged to market at a random time during a ten minute "fuzz period" after the end of the accumulation period. In an alternate embodiment, there is no fuzz period and the auction execution price is determined at a known time at the end of the accumulation period.

Alternate embodiments employ various other auction types. For example, one alternate embodiment employs a "sealed envelope" auction where the limit price on all orders is kept confidential, and a single price is chosen to maximize the size of the matched execution. Another embodiment employs a "private outcry" auction where the initiating user and all notified MP can see all orders and their limit prices as they accumulate, and there is price competition among the responding MPs to trade with the initiating interest. The examples given assume that all orders are executed at the same price; another alternate embodiment employs discriminatory pricing where all orders from responding MPs trade at their limit price. This list is not intended to be exhaustive, as alternate embodiments that employ different auction types will be apparent to those skilled in the art. An alternate embodiment enables the initiating user to choose from more than one different auction type such as those described above.

In step 450, the auction server informs the initiating user and all responding users of the status of their respective orders (i.e., "fill," "partial execution," "canceled," "open," "expired"). In step 460, the auction server of the preferred embodiment enables participants in the auction to communicate with each other and a system administrator to resolve any perceived errors. In a preferred embodiment this communication is via semi-private chat messaging, but alternate embodiments supply telephone contact information. Users can break the trade or negotiate an amendment during a temporary window, after which the trade is final. The use of this window represents a tradeoff between the interest in instant finality to trades and the interest in minimizing the costs and disruption caused by errors. An alternate preferred embodiment does not offer a temporary window to negotiate changes to the executed auction. In step 470, the CTI manager 10 processes the auction activity and updates the CTI user information database to reflect the initiation, response, execution, and trade break activity that took place.

In an alternate preferred embodiment, the auction server 60 also contains a depository of orders not related to an active auction. In this embodiment, any user can place an order in the depository without initiating an auction or invoking CTI targeted notification. These orders are dormant until an auction is initiated in that stock, at which time they are treated by the auction server as a response received from a notified MP in step 410. In an alternate embodiment, the auction server performs a match at periodic intervals without any CTI initiation to clear out the depository of dormant orders. An alternate embodiment performs these auctions only when sufficient dormant interest has accumulated, rather than at defined intervals. In yet another embodiment, these orders are not dormant and are continuously executable subject to their price limit, as in an ECN. Another embodiment enables live execution but with a price limit defined relative to an external price, such as the market midpoint or a certain spread to the end of day VWAP.

In an alternate preferred embodiment, there is no auction server or execution functionality, and the CTI system functions as the targeted information dissemination mechanism depicted in FIG. 2. In this alternate embodiment, after the notification process depicted in FIG. 3, the CTI system does not perform the auction process depicted in FIG. 4, but rather enables the notified MPs to respond to the initiating user via a private or semi-private negotiation chat session as described above. Alternate preferred embodiments also provide the notified MPs with the initiating user's phone number and/or e-mail address to provide other channels of direct communication. After the initiating interest expires or is canceled, the preferred embodiment updates the CTI user database to reflect the initiation and response activity.

In an alternate embodiment, a third-party matching facility, such as Optimark, uses the CTI system to drum up liquidity for a match, then executes the match. For example, a MP may send an order to Optimark and request that a notification be sent out announcing: "There is an order for DELL in Optimark for the next round; please participate." In this embodiment, there is no chat, but there is an address (in the example, Optimark's) where the match is to be executed.

In a further preferred embodiment, the CTI system functions in a manner roughly analogous to a rating service. In this embodiment, the system compares non-certified disseminations of trading activity (such as the disclosures on AutEx+®) to actual certified information, to generate a measure of the overall accuracy of market participants' disclosures. This accuracy rating can be used by other market participants to discriminate among the disclosures on the basis of demonstrated trustworthiness. In another embodiment, the CTI system rates a market participant's compliance with the MP's own stated trading limits. For example, when a MP is negotiating a trade, in order to receive a better price the MP may agree to be bound to a trading cap, to demonstrate that the present order is not part of a much larger trading interest, and that the MP is not simultaneously negotiating similar trades with other MPs. The CTI system can compare the MP's stated trading limits to actual certified information, to generate a measure of the MP's demonstrated trustworthiness. This rating can be used by other MPs to accurately price the likelihood that a negotiated order is part of a much larger order.

In a further embodiment, the CTI system monitors a MP's trading activity for correlation to inappropriate trading behavior, to generate a behavior rating. In this embodiment, the CTI system monitors MP activity for suspected front running. When the system becomes aware that a MP has been notified of a large trading interest (e.g., from an auction notification on the system or through a CTI disseminated over the system), the system monitors the subsequent trading activity of notified MPs to analyze correlation between their trading activity and the revealed CTI. In another embodiment, the CTI system monitors MP activity for suspected peg gaming. The system monitors the trading activity of MPs participating in auctions (on the CTI system or on another system such as POSIT®) in which the price is set relative to a market price such as the midpoint. This trading activity is monitored for negative correlation to represented auction orders (e.g., MPs who sell while a buy order is represented in the auction), which indicates a possible attempt to manipulate the price of the auction execution. In another embodiment, the behavior rating also incorporates information regarding the MP's history of trade breaks.

In all of these "rating service" embodiments, the MP being rated permits the CTI system to use confidential information to rate the MP's past behavior (e.g., disclosures, trade breaks, inappropriate trading activity) in order to receive better prices on future trades or more order flow. This rating information is stored in the CTI user database 50 and can come in many forms, as will be apparent to one skilled in the art. Examples of ratings forms include numerical data (percent divergence between disclosed and actual trading activity or between stated trading cap and actual trading activity), boolean indicators (has the market participant exhibited inappropriate trading behavior or not), or scaled ratings (rating from 1 to n that incorporates information regarding various trading activity scaled according to, for example, recency and frequency of certain activity, degree of correlation to inappropriate behavior, etc.). These examples are not exhaustive, and many representations of the rating data will be apparent to those skilled in the art. In an alternate embodiment, an MP may request that a rating "certificate" be provided to a potential counterparty, to demonstrate to the counterparty the trustworthiness of the MP. The certificate is a certified report based on the MP's market behavior history.

These embodiments provide the described "rating service" function in addition to the auction and execution functionality described in FIG. 4; the ratings can also be used as a dissemination parameter in these embodiments. Alternate embodiments that provide the rating function do not offer the execution functionality and operate as the targeted information dissemination mechanism depicted in FIG. 2; the ratings can be used as a dissemination parameter in these embodiments as well. Further embodiments do not offer execution or targeted dissemination functionality and simply operate as a certification and rating system.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments describe herein are shown only for the purpose of illustration and not for the purpose of limitation.

What is claimed is:

1. A method of managing securities market information, comprising the steps of:
    (a) electronically receiving over a computer network data including confidential trading interest information of securities market participants, wherein said data is not disseminated to any market participant upon receipt or at any future time and comprises data whose dissemination could affect the price or availability of a security;
    (b) electronically storing said received data including confidential trading interest information of securities market participants;
    (c) electronically receiving information from a first securities market participant's computer;
    (d) electronically storing said information received from said first securities market participant's computer;
    (e) producing a targeted dissemination list of securities market participants based on said confidential trading interest information of securities market participants and said information received from said first securities market participant's computer, wherein said targeted dissemination list excludes one or more market participants identified as unlikely to take the contra side to a specified trade and likely to use said information received from said first securities market participant's computer in a manner that would affect the price or availability of said security; and
    (f) electronically transmitting to the securities market participants on said targeted dissemination list data based on said information received from said first securities market participant's computer;
    wherein said first securities market participant's computer does not receive said confidential trading interest information of said securities market participants and does not receive information about size or composition of said targeted dissemination list.

2. The method of claim 1 wherein said confidential trading interest information comprises certified trading interest information.

3. The method of claim 1 further comprising the step of certifying said confidential trading interest.

4. The method of claim 1 wherein said information received from said first securities market participant's computer includes specific dissemination parameters.

5. The method of claim 4 wherein said specific dissemination parameters include certified trading interest requirements.

6. The method of claim 1 wherein said data including confidential trading interest information of securities market participants includes information regarding investment holdings.

7. The method of claim 1 further comprising the steps of:
    electronically receiving data from securities market participants on said targeted dissemination list;
    electronically storing said received data from securities market participants on said targeted dissemination list; and
    electronically transmitting information back to the first securities market participant's computer based on said stored data received from securities market participants on said targeted dissemination list.

8. The method of claim 7 further comprising the step of electronically transmitting information based on said stored data received from securities market participants on said targeted dissemination list to one or more other securities market participants.

9. The method of claim 7 wherein said information transmitted back to the first securities market participant's computer includes an interest in negotiation.

10. The method of claim 2 further comprising the steps of:
    electronically receiving data from securities market participants on said targeted dissemination list;
    electronically storing said received data from securities market participants on said targeted dissemination list; and
    electronically transmitting information back to the first securities market participant's computer based on said stored data received from securities market participants on said targeted dissemination list.

11. The method of claim 10, wherein said information electronically transmitted back to the first securities market participant's computer comprises an order.

12. The method of claim 1, wherein said confidential trading interest information of securities market participants comprises information regarding positions held in securities, securities trades executed, and active securities orders.

13. The method of claim 1, wherein said information received from a first securities market participant's computer comprises numbers of shares of a specified security bought and sold by said first securities market participant during a specified time period.

14. The method of claim 13, wherein said confidential information is provided with the understanding that said information will not be provided to third parties, said confidential information is indeed not provided to said parties, including other market participants and said first securities market participant is provided with verification that said confidential information has not been shared with third parties.

15. The method of claim 13, wherein said confidential information is provided with the understanding that said first securities market participant will be provided with confidential trading interests of other securities market participants.

16. The method of claim 1 wherein said targeted dissemination list comprises likely contra parties for said confidential trading interest.

17. The method of claim 1 wherein said targeted dissemination list excludes contra parties likely to misuse knowledge of said confidential trading interest.

18. The method of claim 17 wherein said contra parties likely to misuse knowledge of said confidential trading interest comprise parties likely to front run.

19. The method of claim 17 wherein said contra parties likely to misuse knowledge of said confidential trading interest comprise parties likely to peg game.

20. A computer program, stored in a computer memory, for managing securities market information comprising:
(a) software for electronically receiving over a computer network data including confidential trading interest information of securities market participants, wherein said data is not disseminated to any market participant upon receipt or at any future time and comprises data whose dissemination could affect the price or availability of a security;
(b) software for electronically storing said received data including confidential trading interest information of securities market participants;
(c) software for electronically receiving information from a first securities market participant's computer;
(d) software for electronically storing said information received from said first securities market participant's computer;
(e) software for producing a targeted dissemination list of securities market participants based on said confidential trading interest information of securities market participants and said information received from said first securities market participant's computer, wherein said targeted dissemination list excludes one or more market participants identified as unlikely to take the contra side to a specified trade and likely to use said information received from said first securities market participant's computer in a manner that would affect the price or availability of said security; and
(f) software for electronically transmitting to the securities market participants on said targeted dissemination list data based on said information received from said first securities market participant's computer;

wherein said first securities market participant's computer does not receive said confidential trading interest information of said securities market participants and does not receive information about size or composition of said targeted dissemination list.

21. The program of claim 20 wherein said confidential trading interest information comprises certified trading interest information.

22. The program of claim 20 further comprising software for certifying said confidential trading interest.

23. The program of claim 20 wherein said information received from said first securities market participant's computer includes specific dissemination parameters.

24. The program of claim 23 wherein said specific dissemination parameters include certified trading interest requirements.

25. The program of claim 20 wherein said data including confidential trading interest information of securities market participants includes information regarding investment holdings.

26. The program of claim 20 further comprising software for:
(a) electronically receiving data from securities market participants on said targeted dissemination list;
(b) electronically storing said received data from securities market participants on said targeted dissemination list; and
(c) electronically transmitting information back to the first securities market participant's computer based on said stored data received from securities market participants on said targeted dissemination list.

27. The program of claim 26 further comprising software for electronically transmitting information based on said stored data received from securities market participants on said targeted dissemination list to one or more other securities market participants.

28. The program of claim 26 wherein said information transmitted back to the first securities market participant's computer includes an interest in negotiation.

29. The program of claim 21 further comprising software for:
electronically receiving data from securities market participants on said targeted dissemination list;
electronically storing said received data from securities market participants on said targeted dissemination list; and
electronically transmitting information back to the first securities market participant's computer based on said stored data received from securities market participants on said targeted dissemination list.

30. The program of claim 29, wherein said information electronically transmitted back to the first securities market participant's computer comprises an order.

31. A method of effecting a targeted auction, comprising the steps of:
(a) electronically receiving over a computer network data including confidential trading interest information of securities market participants, wherein said data is not disseminated to any market participant upon receipt or at any future time and comprises data whose dissemination could affect the price or availability of a security;
(b) electronically storing said received data including confidential trading interest information of securities market participants;
(c) electronically receiving information from a first securities market participant's computer;

(d) electronically storing said information received from said first securities market participant's computer;

(e) producing a targeted dissemination list of securities market participants based on said confidential trading interest information of securities market participants and said information received from said first securities market participant's computer, wherein said targeted dissemination list excludes one or more market participants identified as unlikely to take the contra side to a specified trade and likely to use said information received from said first securities market participant's computer in a manner that would affect the price or availability of said security; and (f) electronically transmitting to the securities market participants on said targeted dissemination list data based on said information received from said first securities market participant's computer;

(g) electronically receiving subsequent orders from securities market participants in response to said transmitted data;

(h) conducting an electronic auction among orders including said orders received in response to said transmitted data; and (i) electronically transmitting the status of orders to the respective securities market participants who initiated them.

32. The method of claim 31 wherein said information from said first securities market participant's computer includes auction parameters.

33. The method of claim 31 wherein said information received from said first securities market participant's computer includes specific dissemination parameters.

34. The method of claim 33 wherein said specific dissemination parameters include certified trading interest requirements.

35. The method of claim 31 wherein said data including confidential trading interest information of securities market participants includes information regarding investment holdings.

36. The method of claim 31 wherein rules governing said electronic auction grant to said first order execution priority over said subsequent orders.

37. The method of claim 31 wherein rules governing said electronic auction prevent the matching of said subsequent orders and an order other than said first order until said first order is canceled or filled.

38. A computer program, stored in a computer memory, for effecting a targeted auction, comprising:

(a) software for electronically receiving over a computer network data including confidential trading interest information of securities market participants, wherein said data is not disseminated to any market participant upon receipt or at any future time and comprises data whose dissemination could affect the price or availability of a security;

(b) software for electronically storing said received data including confidential trading interest information of securities market participants;

(c) software for electronically receiving information from a first securities market participant's computer;

(d) software for electronically storing said information received from said first securities market participant's computer;

(e) software for producing a targeted dissemination list of securities market participants based on said confidential trading interest information of securities market participants and said information received from said first securities market participant's computer, wherein said targeted dissemination list excludes one or more market participants identified as unlikely to take the contra side to a specified trade and likely to use said information received from said first securities market participant's computer in a manner that would affect the price or availability of said security; and (f) software for electronically transmitting to the securities market participants on said targeted dissemination list data based on said information received from said first securities market participant's computer;

(g) software for electronically receiving subsequent orders from securities market participants in response to said transmitted data;

(h) software for conducting an electronic auction among orders including said orders received in response to said transmitted data; and (i) software for electronically transmitting the status of orders to the respective securities market participants who initiated them.

39. The program of claim 38 wherein said information from said first securities market participant's computer includes auction parameters.

40. The program of claim 38 wherein said information received from said first securities market participant's computer includes specific dissemination parameters.

41. The program of claim 40 wherein said specific dissemination parameters include certified trading interest requirements.

42. The program of claim 38 wherein said data including confidential trading interest information of securities market participants includes information regarding investment holdings.

43. The program of claim 38 wherein rules governing said electronic auction grant to said first order execution priority over said subsequent orders.

44. The program of claim 38 wherein rules governing said electronic auction prevent the matching of said subsequent orders and an order other than said first order until said first order is canceled or filled.

45. A method of evaluating a securities market participant's trading activities, comprising the steps of:

(a) electronically receiving data regarding a first securities market participant, wherein said data comprises certified trading activity information and information describing numbers of shares of a specified security bought and sold by said first securities market participant during a specified time period;

(b) electronically storing said received data regarding said first securities market participant;

(c) producing a measure of said first securities market participant's trading activity with respect to a standard, wherein said measure is based at least in part on a net change in said first securities market participant's position as determined by subtracting number of said shares of said specified security sold during said specified time period from number of said shares purchased during said specified time period;

(d) electronically storing said measure;

(e) electronically receiving a request from said first securities market participant to have a report transmitted to a second securities market participant, wherein said report comprises said measure;

(f) electronically storing said received request; and (g) electronically transmitting said requested report to said second securities market participant.

46. The method of claim 45 wherein said standard is based at least in part on how accurate said non-certified trading information disseminated by said securities market participant has been.

47. The method of claim 45 wherein said standard is based at least in part on compliance with trading restraints agreed to by said securities market participant, wherein said trading restraints comprise one or more agreements, agreed to before a specified trade occurred, specifying that the securities market participant would not trade in that security for the remainder of the day on which said specified trade occurred.

48. The method of claim 45 wherein said standard is based at least in part on system-defined inappropriate trading behavior known to affect price or availability of securities.

49. The method of claim 48, wherein said inappropriate trading behavior comprises front running or peg gaming.

50. The method of claim 48, wherein said inappropriate trading behavior comprises trade breaks.

51. The method of claim 45, wherein said received data regarding said first securities market participant comprises confidential information provided by said first securities market participant in order to receive better prices on future trades or more order flow.

52. The method of claim 45, wherein said measure is based at least in part on percent divergence between disclosed and actual trading activity of said first securities market participant.

53. The method of claim 45, wherein said measure is based at least in part on percent divergence between stated trading cap and actual trading activity of said first securities market participant.

54. A computer program, stored in a computer memory, for evaluating a securities market participant's trading activities, comprising:
   (a) software for electronically receiving data regarding a first securities market participant, wherein said data comprises certified trading activity information and information describing numbers of shares of a specified security bought and sold by said first securities market participant during a specified time period;
   (b) software for electronically storing said received data regarding said first securities market participant;
   (c) software for producing a measure of said first securities market participant's trading activity with respect to a standard, wherein said measure is based at least in part on a net change in said first securities market participant's position as determined by subtracting number of said shares of said specified security sold during said specified time period from number of said shares purchased during said specified time period;
   (d) software for electronically storing said measure;
   (e) software for electronically receiving a request from said first securities market participant to have a report transmitted to a second securities market participant, wherein said report comprises said measure;
   (f) software for electronically storing said received request; and
   (g) software for electronically transmitting said requested report to said second securities market participant.

55. The program of claim 54 wherein said standard is based at least in part on how accurate said non-certified trading information disseminated by said securities market participant has been.

56. The program of claim 54 wherein said standard is based at least in part on compliance with trading restraints set agreed to by said securities market participant, wherein said trading restraints comprise one or more agreements, agreed to before a specified trade occurred, specifying that the securities market participant would not trade in that security for the remainder of the day on which said specified trade occurred.

57. The program of claim 54 wherein said standard is based at least in part on system-defined inappropriate trading behavior known to affect price or availability of securities.

58. A method of managing securities market information, comprising the steps of:
   (1) enabling a first securities market participant to target dissemination of trading interests to only those other securities market participants likely to have a significant contra-interest, wherein said enabling comprises, for each order placed by said first securities market participant, creating a targeted dissemination list and ensuring that securities market participants not listed on said targeted dissemination list from receive no information regarding said order;
   (2) enabling securities market participants to ensure that other securities market participants' disseminated trading interests are validated as legitimate; and
   (3) enabling auctions among trading interests targeted and validated as in the preceding steps.

* * * * *